Figure 1:
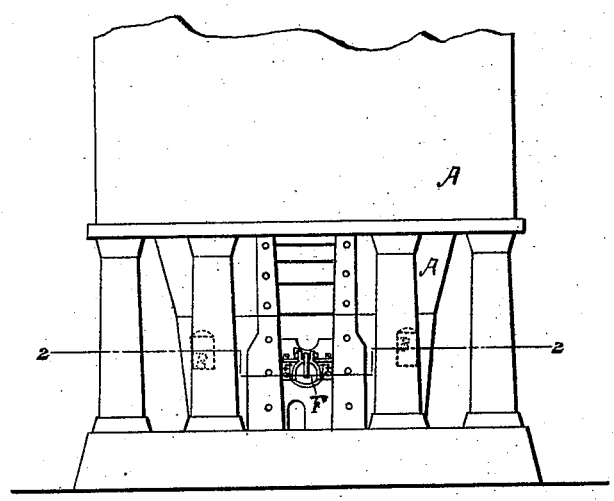

2 Sheets—Sheet 1.

H. C. GRITTINGER.
Flushing Slag or Cinder from Blast-Furnaces.

No. 209,119. Patented Oct. 22, 1878.

WITNESSES
Geo. W. Breck.
Wm. T. Kilgrove

INVENTOR.
Henry C. Grittinger.
By his Attorneys
Baldwin, Hopkins & Peyton.

2 Sheets—Sheet 2.

H. C. GRITTINGER.
Flushing Slag or Cinder from Blast-Furnaces.

No. 209,119. Patented Oct. 22, 1878.

WITNESSES
Geo. W. Breck
Wm. T. Kilgrove

INVENTOR
Henry C. Grittinger.

By his Attorneys
Baldwin, Hopkins & Peyton

N. PETERS, PHOTO-LITHOGRAPHER, WASHINGTON, D. C.

UNITED STATES PATENT OFFICE.

HENRY C. GRITTINGER, OF CORNWALL, PENNSYLVANIA.

IMPROVEMENT IN FLUSHING SLAG OR CINDER FROM BLAST-FURNACES.

Specification forming part of Letters Patent No. 209,119, dated October 22, 1878; application filed September 16, 1878.

*To all whom it may concern:*

Be it known that I, HENRY C. GRITTINGER, of Cornwall, in the county of Lebanon and State of Pennsylvania, have invented a new and useful Improvement in the Method of Flushing Slag or Cinder from Blast-Furnaces in the manufacture of iron, and certain improvements in apparatus therefor, of which the following is a specification:

The object of my invention is to flush out or remove from the furnace, at intervals, with the slag and cinder, any infusible or insoluble material injurious to the iron—such as slate, unburned lime, dirt, &c.

Heretofore in the working of commonly-used furnaces of ordinary construction it has been customary, in tapping or removing the melted slag and cinder from a blast-furnace, to make an opening under the weight-plate, if an open-front furnace, or at a place specifically intended for the purpose, if a closed furnace, usually with an iron bar of small size—say about an inch and a quarter in thickness. Such method is objectionable, the aperture or flushing opening so made being limited in area by the material surrounding it to a few square inches, thus preventing the carrying off with the slag and cinder of the injurious solid matters or infusible material accumulated in the crucible of the furnace.

Provision has also been made for flushing by a perforated water-block or discharge-piece in an opening in the hearth of a furnace, through which to discharge the slag, &c. Moreover, it has been proposed to control the discharge (so as to flush at intervals) by regulating the temperature of the discharge-piece, so that its opening might choke up by cooling and the clogging slag be melted by heating.

My improvements consist, in the first place, of a novel method, hereinafter described, of flushing or washing out, at intervals, with the slag and cinder, such infusible material or foreign solid substances as may accumulate on the melted iron in the crucible of the furnace, thereby increasing the yield and improving the quality of the iron; and in the second place my improvements consist in certain peculiar organizations of parts and in certain combinations of devices whereby the furnace is adapted for carrying out my improved method.

I employ an attachment or device provided with a large opening and attached to or inserted either in the side or in the fore part of the furnace, a little below the level of the tuyeres, said attachment consisting of a tymp or water-breast, which may be either separate from or combined with a water-block or tuyere, with or without a bottom, or simply a water-block or tuyere, the large aperture or flushing-opening being closed by means of a door, which is fastened in position by a ratchet and detent, weighted lever, or prop. The tymp, water-block, or tuyere may be made of metal or of fire-clay, or any refractory material or a combination of these, and be suitably protected, as may be required, by means of a flow of cold water running through it or through a coil of pipe inclosed in or encircling it in suitable well-known ways. The attachment is placed in position and secured in suitable way, the opening packed and stopped, (with wet coal-dust and stopping-clay,) the stopping being prevented from blowing out by securing the door. After the blast has been put on the furnace and continued until the cinder has risen above the bottoms of the tuyeres the blast is slackened, the door thrown back, and the outside packing of clay removed, and an opening made through the coal-dust stopping. The blast being again thrown on speedily removes all the stopping, exposing a large flushing-outlet, through which the slag, cinder, &c., is carried off. After nearly all the cinder has been flushed out the blast is thrown off and the aperture again closed preparatory to repetitions of the above-described operation at proper intervals.

The improvements claimed will hereinafter be designated.

Figure 2:
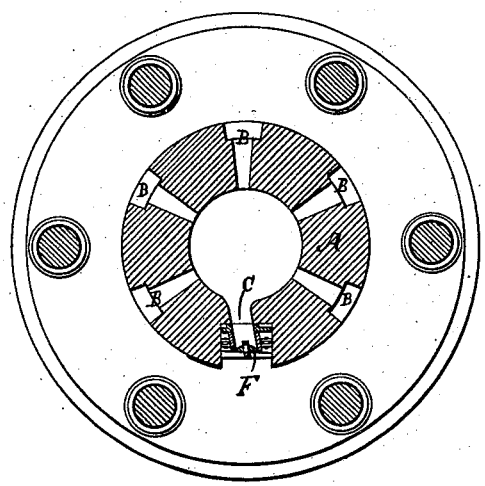
Figure 3:
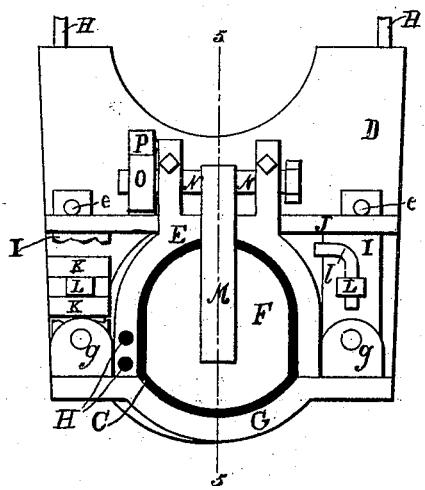
Figure 5:
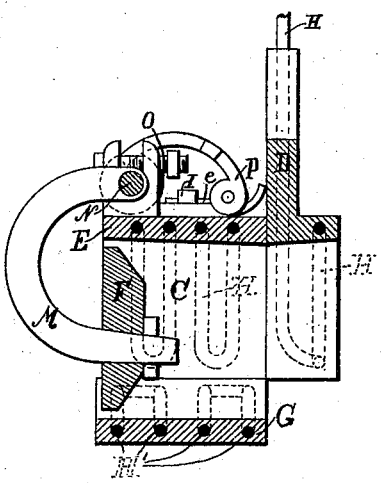
Figure 4:
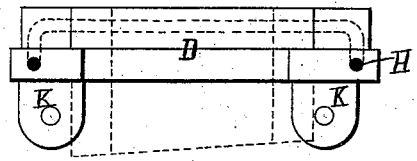
Figure 6:
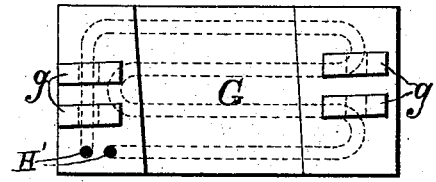
Figure 7:
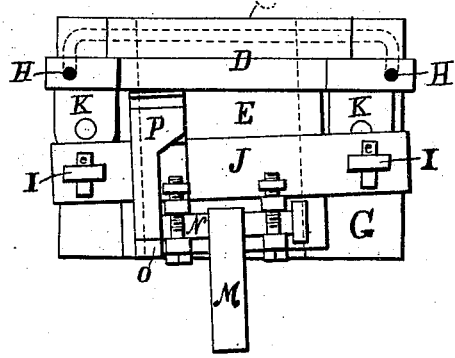

In the accompanying drawings, which show so much of a blast-furnace as is necessary to illustrate my improvements or means for carrying out my method, embodied in the best way now known to me, Figure 1 is a front elevation of the furnace with the shaft omitted, that portion downward from or including and below the boshes only being shown; Fig. 2, a cross-section on the line 2 2 of Fig. 1. Fig. 3 is a view showing in detail the front of the flushing device or attachment, with parts removed; Fig. 4, a top view of the tymp or water-breast; Fig. 5, a section on the line 5 5 of Fig. 3; Fig. 6, a top view of the weight-plate to which the water-block is attached; Fig. 7, a top view of devices shown in Figs. 3 and 5.

Any suitable furnace, A, is provided with tuyeres B of the desired number, and a little below the level of the bottom portions of the tuyeres is provided a flushing-opening, C. The top of the opening C might be on a level with the bottoms of the tuyere-openings, or very slightly above; but it is preferably below the level of the tuyeres.

The device or attachment (considered as a whole) by which the flushing-aperture is provided and secured to the furnace is in the present instance constructed as follows—that is, made up of a tymp or water-breast, D, a water-block or tuyere, E, with the large opening C, a hinged door, F, to close the opening, connections or coupling attachments (presently to be described) between the different parts, a weight-plate or bottom, G, for the water-block, and water-circulating pipes H and H' for cooling the parts.

The tymp D may be cast in one piece with the water-block E and weight-plate or bottom piece G, or the weight-plate with the tymp be cast separately from the water-block, as shown by the dotted lines, Fig. 4. In the preferred construction, (shown by the drawings,) the weight-plate G is secured to the bottom of the water-block by means of lugs *g g* on the weight-plate, to which are jointed bars or upright rods I I, which are shouldered near the upper ends and pass through openings in the ends of a cross-bar, J, on the top of the water-block, and are secured to said cross-bar by keys or wedge-pins *e e* passing through the uprights I above the bar. Lugs K K on the tymp-plate or water-breast D serve, in connection with eye-bars or short links L L and the rods I I, to connect the water-block and tymp-plate. The links are each pivoted at one end to the lugs K, and at their opposite ends are shouldered and pass through openings in the rods I, and are drawn tight and secured by pins or wedges *l* passing through the links in front of the rods. By this construction any part of the device which may be broken or otherwise injured may be removed and renewed without impairing the rest.

The door F is secured to a curved hinged arm or bail, M, attached to a pivot or turning-rod, N, removably mounted in suitable bearing lugs or supports upon the top of the water-block. A suitable notched disk or ratchet-stop, O, upon one end of the rod N is acted upon by a detent, P, so as to securely hold the door when closed; but any other suitable securing device may be employed.

The operation is as follows: Before putting the blast on the furnace the aperture or opening is closed first with wet coal-dust properly packed with a stopping-hook to within a few inches of the outside. Upon this is then packed in a similar manner a few inches in thickness of stopping-clay, and all securely prevented from blowing out by the door properly fastened. After the blast is put on the furnace I prefer to let the cinder in the furnace rise above the bottom of the tuyeres. The blast is then slackened upon the furnace, the door unfastened and thrown back, and the outside packing of clay removed. An opening is then made through the coal-dust stopping by means of an iron pricking-bar. The blast is then thrown on the furnace again, and speedily removes all the coal-dust stopping with the washing out or flushing of the slag or cinder, which also carries off with it such infusible material as may have passed down to the crucible of the furnace. After nearly all the cinder has been flushed out the blast is thrown off the furnace and the aperture again closed in the manner above described.

The above-described operation is repeated at intervals between the successive times for casting or running the iron.

By my improvements in the manufacture of iron the yield of the furnace is increased and the quality of the iron materially improved.

I claim as of my own invention—

1. As an improvement in the manufacture of iron, the hereinbefore-described method of flushing the cinder, &c., directly from the furnace at intervals, which consists in slackening the blast and opening the flushing-aperture, then throwing on the blast to flush, and again slackening to admit of the closing of the flushing-aperture, substantially as set forth.

2. A blast-furnace provided with the tuyeres, the flushing-aperture, and the door for closing said aperture, substantially as and for the purpose set forth.

3. The hereinbefore-described sectional flushing device or attachment, consisting of the combination of the tymp or water-breast, the water-block or tuyere, provided with the large opening, the hinged door, the weight-plate, and the water-circulating pipes.

In testimony whereof I have hereunto subscribed my name.

HENRY C. GRITTINGER.

Witnesses:
GEORGE WALTZ,
WM. C. FREEMAN.